Oct. 29, 1935.                M. MANNE                2,019,053
FINGER RING
Filed July 10, 1935
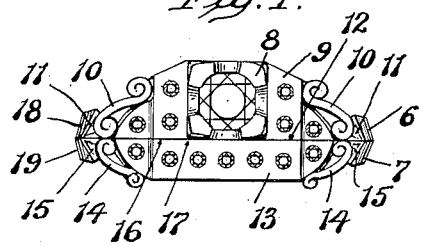
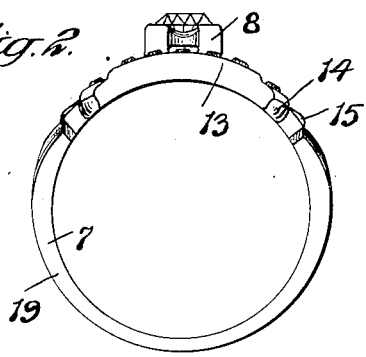
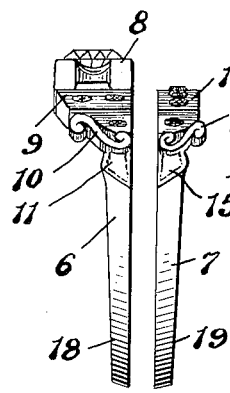
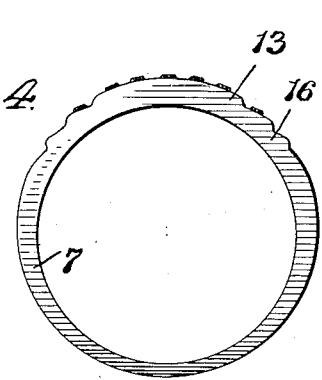
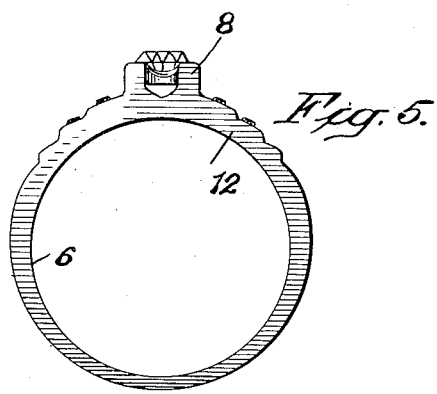
INVENTOR
Moe Manne
BY
Harry Radzinsky
ATTORNEY Patented Oct. 29, 1935

2,019,053

UNITED STATES PATENT OFFICE 2,019,053

FINGER RING

Moe Manne, New York, N. Y.

Application July 10, 1935, Serial No. 30,584

1 Claim. (Cl. 63—15)

This invention relates to an improvement in finger rings, and has for its object the provision of means whereby several rings when worn together on the same finger will fit together in cooperative relationship and design to provide the effect of a single ring. Such an arrangement as herein contemplated is particularly adaptable for engagement and wedding rings which are customarily worn in juxtaposition on the same finger. By providing both of these rings with cooperating contacting faces whereby a smooth, even and close fitting contact of the two rings is assured, and by providing both rings with cooperating engraved or carved design elements, the two rings will form an ensemble very closely resembling a single ring. Many interesting and attractive effects can be thus provided by the use of different designs and shapes, the several ring members used being in each case closely associated in contiguous relationship and having flush upper surfaces to provide the effect of a single ring when worn in juxtaposition on the same finger. The two ring members employed are of such shape and design that when worn independently of one another, they are easily recognizable as engagement and wedding rings.

In the accompanying drawing wherein a preferred embodiment of the invention is shown, Fig. 1 is a plan view of a ring assembly made in accordance with this invention; Fig. 2 is a side elevation of the same; Fig. 3 is an edge view of the two ring members in spaced relationship; Fig. 4 is a side view of the wedding ring member; and Fig. 5 is a similar view of the engagement ring member.

As will be clearly seen in Figs. 1 and 3, the ring is composed of two separate annular ring members designated at 6 and 7. The part shown at 6 is made in the shape of an engagement ring and is easily recognizable as such, and is in the illustrative design shown, provided with a central setting 8 surrounded by a table portion 9 set with stones or otherwise embellished. Said engagement ring 6 is provided with design elements, as for example the scroll 10 and portion 11. It is also so shaped that its setting is substantially off-set so that it is provided with at least one smooth, flat face 12.

The wedding ring member shown at 7 contains similar co-operating design elements such as the table portion 13, the scroll 14, similar to that shown at 10 on the engagement ring portion, and part 15 similar to that shown at 11 on the engagement ring member. The wedding ring member is provided with at least one flat side or face 16 similar to that shown at 12 on the engagement ring portion.

In Fig. 1 the two rings are shown in the manner in which they are placed together and worn on the same finger. It will be seen that when the rings 6 and 7 are so placed, their respective flat sides 12 and 16 lie in contact with one another. These sides or faces 12 and 16 are smooth and flat and when the two ring portions 6 and 7 are placed together, the perceptibility of the joint between them, indicated at 17 in Fig. 1, is greatly decreased, and the simulation of a single ring is provided. This effect is greatly enhanced by the fact that both ring members 6 and 7 of the ring bear design elements, raised, carved or otherwise produced, which lie flush when the two ring members fit together to form a unitary design. The shank portions 18 and 19 of the respective ring parts 6 and 7 are also so shaped that when the two parts are placed together, the effect also of a single shank is produced.

While the two ring elements 6 and 7 are adapted to be worn together to provide the effect of a single ring, they are so designed and formed that they can be worn separately without presenting the effect of an incomplete design and they are independently recognizable as engagement and wedding ring respectively. A purchaser may accordingly, at one time purchase the engagement ring portion 6 of the ring, and at a later date purchase the wedding ring portion 7, and the two parts when worn together will match, will lie flush, and will produce the effect of a single ring.

While I have shown the rings of a certain design, it will be obvious that the design elements borne thereon are merely illustrative and a multiplicity of other designs may be used to create the same impression, that is, of a single ring, when the two ring elements are worn in juxtaposition on the same finger.

What I claim is:

A finger ring consisting of several annular ring members, one of which is shaped and independently recognizable as a wedding ring and the other shaped to represent an engagement ring, the wedding ring having the major portion of its top lying flush with the greater portion of the top of the engagement ring, both ring members having at least one flat side so that they may be placed together in flat abutment, the ring members each bearing design elements, the design elements on one of the ring members co-operating and lying flush with those on the other to form the effect of a single ring when the two ring elements are worn on the same finger with their flat faces in abutment.

MOE MANNE.